United States Patent
Hobo

[11] Patent Number: 5,991,052
[45] Date of Patent: Nov. 23, 1999

[54] FACSIMILE INTERFACED TO INFORMATION PROCESSING APPARATUS

[75] Inventor: Yoshihiro Hobo, Gifu, Japan

[73] Assignee: Sanyo Electric Co., Ltd., Osaka, Japan

[21] Appl. No.: 08/881,375

[22] Filed: Jun. 24, 1997

Related U.S. Application Data

[63] Continuation of application No. 08/430,736, Apr. 28, 1995.

[51] Int. Cl.⁶ .............................. H04N 1/40; H04N 1/00; H04N 1/32

[52] U.S. Cl. .......................... 358/457; 358/457; 358/442; 358/407; 358/404; 358/444; 358/440; 358/468; 358/408

[58] Field of Search ..................... 358/442, 407, 358/404, 444, 440, 468, 402, 457

[56] References Cited

U.S. PATENT DOCUMENTS

| | | | |
|---|---|---|---|
| 4,607,289 | 8/1986 | Kurokawa | 358/440 |
| 5,216,517 | 6/1993 | Kinoshita et al. | 358/440 |
| 5,459,579 | 10/1995 | Hu et al. | 358/444 |
| 5,530,558 | 6/1996 | Nachman | 358/442 |
| 5,552,901 | 9/1996 | Kikuchi et al. | 358/468 |

Primary Examiner—Edward L. Coles
Assistant Examiner—Twyler Lamb
Attorney, Agent, or Firm—Darby & Darby

[57] ABSTRACT

A facsimile apparatus is connected to an information processing apparatus, such as a computer, which executes a communication protocol defined by a general-purpose communication application software program. The facsimile apparatus includes an own number memory which stores an own number, and determines whether or not an addressing number sent by the computer corresponds with the own number. When the own number and the addressing number do not correspond with each other, the facsimile apparatus transmits image data sent from the computer to another facsimile apparatus which is indicated by the addressing number. If the own number and the addressing number correspond with each other, the facsimile apparatus responds to the computer with dummy response information, and image data is sent from the computer to a printer to be printed out.

11 Claims, 5 Drawing Sheets

PERSONAL COMPUTER 14 — FACSIMILE 12

| 101 | DIAL COMMAND |
| 102 | DIAL INFORMATION |

| ABILITY INFORMATION | 201 |
| 103 | REQUEST TO SEND COMMAND |
| ACKNOWLEDGEMENT | 202 |
| 104 | TRAINING COMMAND |
| ACKNOWLEDGEMENT | 203 |
| TRAINING RESULT INFORMATION | 204 |
| 105 | COMPUTER IMAGE DATA |
| ACKNOWLEDGEMENT | 205 |
| 106 | END OF PROCEDURE COMMAND |
| ACKNOWLEDGEMENT | 206 |
| END CONFIRMATION | 207 |
| 107 | DISCONNECTION COMMAND |
| ACKNOWLEDGEMENT | 208 |

*Fig. 3*

FACSIMILE INTERFACED TO INFORMATION PROCESSING APPARATUS

This is a continuation of application Ser. No. 08/430,736, filed Apr. 28, 1995.

BACKGROUND OF THE INVENTION

1. Field of the Invention

The present invention relates to a facsimile apparatus capable of being connected to an information processing apparatus. More specifically, the present invention relates to a facsimile apparatus interfaced to an image processing apparatus capable of executing a general-purpose facsimile communication application software.

2. Description of the Prior Art

A facsimile apparatus is a means for electrically transmitting document information to a remote place by utilizing a telephone line, and reads an original by a digital scanner utilizing a CCD, for example, and converts an original information signal into a compressed code and transmits the code to an addressing facsimile apparatus. However, in recent years, a facsimile board by which a document produced by an information processing apparatus such as a personal computer, a word processor, etc., can be transmitted from a facsimile apparatus to an addressing facsimile apparatus has been developed. The interfaces between the information processing apparatus, the facsimile board and the facsimile apparatus have come to be standardized (EIA specification classes 1, 2 and so on). In accordance with such standardization, a general-purpose facsimile communication application software (hereinafter, simply called as "a general-purpose communication software" applicable to such a standard interface has been supplied.

In the general-purpose communication software, a transmission function by which a document produced by an information processing apparatus is transmitted to another facsimile apparatus via a facsimile apparatus being connected to the information processing apparatus by the standard interface, and a reception function by which a document being sent from another facsimile apparatus is written in a memory of the information processing apparatus are supported. That is, in the general-purpose communication software, a print function by which a document produced by the information processing apparatus is directly printed-out by the facsimile apparatus is not supported.

In addition, in a prior art device disclosed in Japanese Patent Application Laying-open No. 62-249560 laid-open on Oct. 30, 1987 or Japanese Patent Application Laying-open No. 61-292467 laid-open on Dec. 23, 1986, in a local operation mode or a remote print mode, a file held by an information processing apparatus can be printed-out by a printer of a facsimile apparatus.

However, in the prior art disclosed in Japanese Patent Application Laying-open Nos. 62-249560 and 61-292467, if a specific control command is not applied to a facsimile apparatus from an information processing apparatus, the facsimile apparatus can not print-out the document from the information processing apparatus. Therefore, in order to implement such a print function, a specific software is further required, and accordingly, the aforementioned general-purpose communication software can not be utilized as it is.

SUMMARY OF THE INVENTION

Therefore, a principal object of the present invention is to provide a facsimile apparatus in which a document from an information processing apparatus can be printed-out by the facsimile apparatus even if the general-purpose communication software is utilized.

A facsimile apparatus according to the present invention comprises a print means for printing-out image data, and interfaced to an information processing. apparatus which executes a general-purpose facsimile communication application software. Then, the facsimile apparatus further comprises: a holding its means for holding self or own identification information which identifies the facsimile apparatus; a determination means for determinating whether or not addressing information being sent from the information processing apparatus corresponds to the self identification information; a first response means for sending first response information to the information processing apparatus when the determination means determines that the addressing information corresponds to the own or self identification information; and an image data supplying means for supplying image data being sent from the information processing apparatus to the print means when the determination means determines that the addressing information corresponds to the self identification information.

The information processing apparatus such as a personal computer, word processor and etc. executes the general-purpose communication software. Information for specifying another facsimile apparatus to which a file held by the information processing apparatus is to be sent, e.g. a telephone number (addressing information) and information or number specifying the file (file information) are inputted to the information processing apparatus by an operator. The information processing apparatus sends the addressing information to the facsimile apparatus. In the facsimile apparatus, the addressing information being sent from the information processing apparatus and the own identification information are compared with each other so as to determine whether or not the both are coincident with each other. That is, it is determined whether or not the addressing information is corresponding to the own identification information. If the addressing information is corresponding to the own identification information, the facsimile apparatus returns ability information indicative of an ability of the facsimile apparatus to the information processing apparatus, and prints-out the image data of the file being sent from the information processing apparatus.

In accordance with the present invention, since a specific control command is not needed to be used, even if the general-purpose communication software is utilized, the image data of the file from the information processing apparatus can be directly printed-out by the facsimile apparatus being connected to the information processing apparatus.

In another aspect of the present invention, the facsimile apparatus comprises: a modulation means for receiving image data and converting the image data into a facsimile signal; a print means for executing a print operation according to an image data; a hold means for holding own identification information identifying the facsimile apparatus; a determination means for determining whether or not addressing information being sent from the information processing apparatus is corresponding to the own identification information; and a selector means for selectively supplying image data being sent from the information processing apparatus to one of the modulation means and the print means in accordance with a determination result of the determination means.

In this aspect, if the addressing information is corresponding to the own identification information, the selector means supplies the image data of the file being sent from the information processing apparatus to the print means. If the addressing information is not corresponding to the own identification information, the selector means supplies the image data of the file being sent from the information processing apparatus to the modulation means. Therefore, in the former case, the image data of the file being sent from the information processing apparatus is printed-out by the print means, and in the latter case, the image data of the file being sent from the image processing apparatus is transmitted to another facsimile apparatus indicated by the addressing information.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a timing chart showing a file print sequence in FIG. 1 embodiment;

DETAILED DESCRIPTION OF THE PREFERRED EMBODIMENTS

Figure 1:
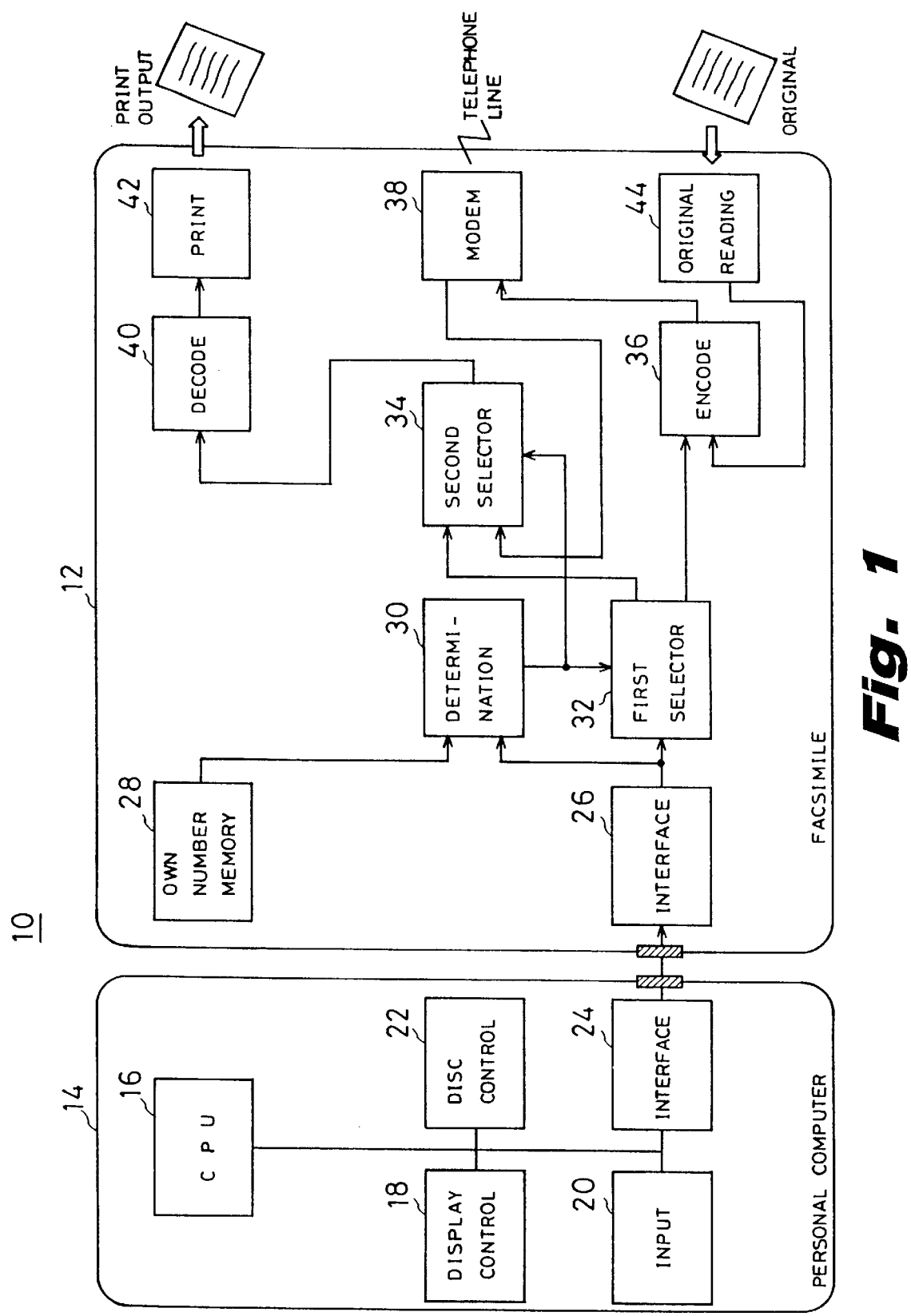
FIG. 1 is a functional block diagram showing one embodiment according to the present invention.

A facsimile system 10 of this embodiment shown in FIG. 1 includes a facsimile apparatus 12 and a personal computer 14 connected to the facsimile apparatus 12. The personal computer 14 includes a CPU 16 which is coupled to a display control circuit 18, an input circuit 20, a disc control circuit 22 and an interface 24 by a suitable bus.

The disc control circuit 22 reads the general-purpose communication software from a disc (not shown) and applies the same to the CPU 16. Therefore, the CPU 16 executes the general-purpose communication software. When the general-purpose communication software is executed by the CPU 16, a display for requesting to enter addressing information and selection of a file to be transmitted is displayed on a screen of a display (not shown) by the display control circuit 18. Therefore, an operator inputs the addressing information and information of the file to be transmitted by utilizing the input circuit 20.

Data of the file designated by the file information as inputted is converted into an image signal according to the execution of the general-purpose communication software by the CPU 16, and further subjected to a coding process such as MF (Modified Huffman), MR (Modified READ) or the like. Image data of the file thus compressed and coded (hereinafter, simply called as "computer image data") is outputted from the interface 24 to the facsimile apparatus 12 according to a facsimile communication protocol executed by the general-purpose communication software.

An interface 26 of the facsimile apparatus 12 is connected to the interface 24 of the personal computer 14. Thus, in the system 10 shown in FIG. 1, the facsimile apparatus 12 and the personal computer 14 are connected to each other by standard interfaces. The facsimile apparatus 12 outputs response information with respect to the facsimile communication protocol executed by the personal computer 14 from the interface 26, and makes communication with another facsimile apparatus (not shown) according to a facsimile communication protocol which is originally owned by the facsimile apparatus 12.

In an own number memory 28 of the facsimile apparatus 12, an own number corresponding to a telephone number of the facsimile apparatus 12 is registered in advance. In addition, the number to be registered in the memory 28 is not limited to the telephone number, and may be an arbitrary number if its number does not duplicate to telephone numbers of other facsimile apparatus. Then, data of the own number being registered in the own number memory 28 is applied to a determination circuit 30. To the determination circuit 30, data of the addressing number inputted from the personal computer 14 is further applied via the interface 26. The determination circuit 30 compares the own number data and the addressing number data with each other to determine whether or not the own number and the addressing number are coincident with each other. Then, the determination circuit 30 outputs a determination result to a first selector 32 and a second selector 34.

The first selector 32 selectively applies the computer image data which is inputted from the personal computer 14 via the interface 26 to the second selector 34 or an encode circuit 36. More specifically, the first selector 32 applies the computer image data being inputted from the interface 26 to the second selector 34 when a determination signal from the determination circuit 30 indicates coincidence of the own number and the addressing number. Furthermore, if the determination signal indicates non-coincidence of the own number and the addressing number, the first selector 32 applies the computer image data or file image to the encode circuit 36.

The second selector 34 receives the computer image data which is inputted from the personal computer 14 via the first selector 32 and image data which is inputted from another facsimile apparatus (not shown) via a modem circuit 38 (hereinafter simply called as "facsimile image data"), and selects one of the image data to apply the selected one to a decode circuit 40. More specifically, the second selector 34 applies the computer image data outputted from the first selector 32 to the decode circuit 40 at a time that the determination signal from the determination circuit 30 indicates the coincidence of the own number and the addressing number. Furthermore, if the determination signal indicates the incoincidence of the both numbers, the second selector 34 applies the facsimile image data being inputted from the modem circuit 38 to the decode circuit 40.

Therefore, the decode circuit 40 decodes the computer image data outputted from the second selector 34 or the facsimile image data outputted from the modem circuit 38, and outputs decoded image data to a print portion 42. The print portion 42 includes a printer such as an LED printer, a laser beam printer, a thermal printer or the like, and executes a print operation on the basis of the decoded image data.

In addition, an original reading portion 44 includes a digital scanner utilizing a CCD, for example, thereby to read an original, and applies an image signal to the encode circuit 36.

The encode circuit 36 encodes and compresses the computer image data from the first selector 32 or the image signal from the reading portion 44, and outputs the image data being obtained through such a process to the modem circuit 38. In addition, in this embodiment shown, since the computer image data which has been compressed and encoded is inputted from the personal computer 14, the encode circuit 36 may output the computer image data as it is to the modem circuit 38.

The modem circuit 38 modulates the image data applied from the encode circuit 36 into a signal suitable for a telephone line, or demodulates a signal being sent from another facsimile apparatus (not shown) through a telephone line and applies a demodulated signal to the second selector 34.

Figure 4:
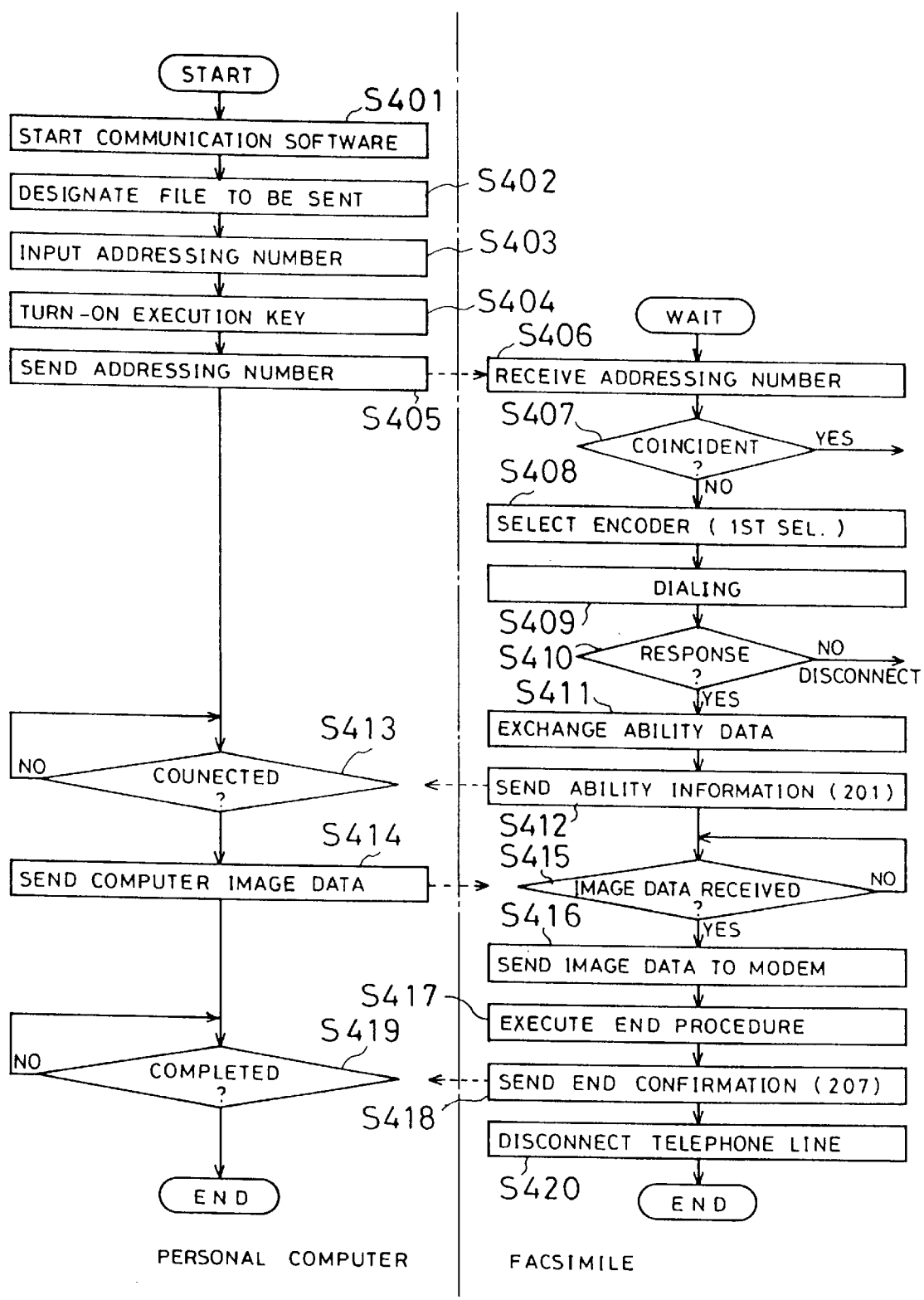
FIG. 4 is a flowchart showing an operation of FIG. 2.

Next, with referring to FIG. 2 and FIG. 4, an operation of FIG. 1 embodiment in a basic transmission sequence will be described. First, in step S401 of FIG. 4, an operator starts the general-purpose communication software on the personal computer 14. In a next step S402, the operator designates a file of the microcomputer 14 to be transmitted by the input circuit 20. Furthermore, the operator inputs through the input circuit 20 a telephone number of another facsimile apparatus (not shown) to which the file is to be transmitted in a step S403. Then, the operator depresses an execution key (not shown) of the input circuit 20 in a step S404, whereby a transmission protocol for the computer image data from the personal computer 14 to the facsimile apparatus is started.

Figure 2:
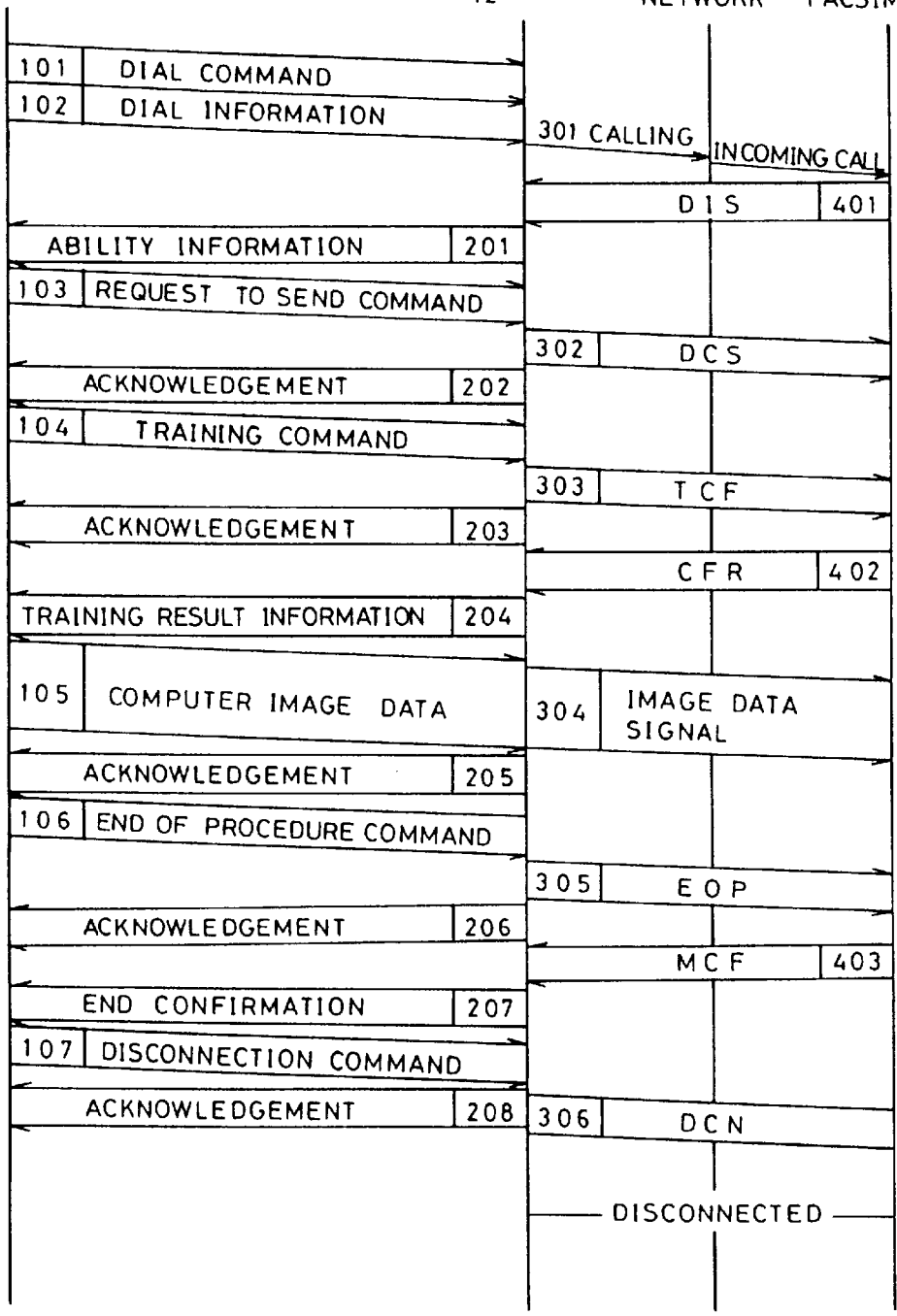
FIG. 2 is a timing chart showing a basic transmission sequence in FIG. 1 embodiment.

In a step S405, the addressing number as inputted by the operator is sent to the facsimile apparatus 12 from the interface 24 of the personal computer 14 as a dial command (101) and dial information (102) of FIG. 2. The facsimile apparatus 12 receives the addressing number which is then applied to the determination circuit 30 via the interface 26 in a step S406. Therefore, in a step S407, the determination circuit 30 compares the addressing number being inputted from the personal computer 14 with the own number being read-out from the memory 28 so as to determine whether or not the both are coincident with each other. In addition, in the basic transmission sequence, since the addressing number from the personal computer 14 and the own number of the facsimile apparatus 12 are different from each other, the process proceeds to a next step S408.

More specifically, if the non-coincidence of both numbers is detected by the determination circuit 30, the computer image data from the personal computer 14 is sent to the encode circuit 36 via the first select 32 in response to a non-coincidence signal from the determination circuit 30. In a next step S409, an NCU (not shown) of the facsimile apparatus 12 performs a calling or dialing (301) shown in FIG. 2 according to the addressing number sent from the personal computer 14. A telephone network, e.g. a switch board (not shown), receives the calling or dialing (301) and sends a calling signal to another facsimile apparatus (not shown).

In another facsimile apparatus, when the calling signal is received, the telephone line is connected to the telephone network (switch board) by an NCU. Therefore, in a step S410 succeeding the step S409, the facsimile apparatus 12 determines whether or not a response signal is returned from another facsimile apparatus. If the response signal is not detected, the NCU of the facsimile apparatus 12 disconnects the telephone line.

After the above described response signal is outputted, another facsimile apparatus sends ability data (401) indicative of the ability of the facsimile apparatus such as precision, paper size, communication speed and etc., i.e. a DIS (Digital Identification Signal). Therefore, in a step S411, the facsimile apparatus 12 receives the ability data, i.e. the DIS from another facsimile apparatus. Then, the facsimile apparatus 12 sends information required for the personal computer 14 out of received ability data to the personal computer 14 via the interfaces 26 and 24 as ability information (201) (step S412). Thus, if the ability or function of another facsimile apparatus is sent to the personal computer 14 as the ability information (201), in a step S413, the personal computer 14 detects that the lines are completely connected to each other between the personal computer 14 and another facsimile apparatus (the addressing facsimile apparatus). Therefore, in a next step S414, the personal computer 14 sends the computer image data (105) to the facsimile apparatus 12.

At this time, the personal computer 14 sends a request to send command (103) for transmitting the computer image data to the addressing facsimile apparatus (another facsimile apparatus) to the facsimile apparatus 12. Then, the facsimile apparatus 12 derives necessary information from the request to send command (103), and converts derived information into a transmission request number (302) applicable to the protocol of the facsimile apparatus 12, i.e. a DCS (Digital Command Signal). Therefore, the transmission request number (302), i.e. the DCS is transmitted to the addressing facsimile apparatus through the telephone line.

The facsimile apparatus 12 further sends an execution confirmation response signal (203) with respect to the above described request to send command (103) to the personal computer 14 as an acknowledgment. Therefore, the personal computer 14 sends a training result information (204) for confirming a state of the telephone line to the facsimile apparatus 12 after the acknowledgment (203) is received. Then, the facsimile apparatus 12 sends a training signal (303) applicable to the protocol of the facsimile apparatus 12, i.e. a TCF (Training Check) to the addressing facsimile apparatus.

The addressing facsimile apparatus transmits a training result signal (402) i.e. a CFR (Confirmation to Receive) to the facsimile apparatus 12 if the training signal (303), i.e. the TCF could be correctly received. When the training response signal (402), i.e. the CFR is received, the facsimile apparatus 12 applies training result information (204) to the personal computer 14. After the training result information (204) is received, the personal computer 14 executes the above described step S414.

If the computer image data (105) is sent from the personal computer 14 to the facsimile apparatus 12, in a step S415, the facsimile apparatus 12 detects the computer image data, and in a next step S416, the computer image data is applied to the modem circuit 38 through the first selector 32 and the encode circuit 36. More specifically, the facsimile apparatus 12 produces a computer image data signal (304) by modulating the computer image data from the personal computer 14, and transmits the signal (304) to the addressing facsimile apparatus. The addressing facsimile apparatus demodulates the computer image data signal (304) into computer image data, and directly or after storing in a memory, prints-out the computer image data.

If the transmission of the computer image data signal for one page is completed, the facsimile apparatus 12 sends a page completion confirmation response signal (205) to the personal computer 14 as an acknowledgment. In response thereto, the personal computer 14 sends the computer image data of a next page if any to the facsimile apparatus 12. Then, after the transmission of all the computer image data is detected, the personal computer 14 sends an end of procedure command (106) to the facsimile apparatus 12.

When the end of procedure command (106) from the personal computer 14 is received, the facsimile apparatus 12 executes a completion procedure in a next step S417. More specifically, the facsimile apparatus 12 produces a page completion signal (305), i.e. an EOP (End of Procedure) on the basis of the end of procedure command (104), and transmits the page completion signal (305), i.e. the EOP to the addressing facsimile apparatus. At this time, the facsimile apparatus 12 sends an acknowledgment (206) to the personal computer 14.

If the page completion signal (305), i.e. the EOP is detected, the addressing facsimile apparatus returns a page completion confirmation signal (403), i.e. an MCF (Message Confirmation) to the facsimile apparatus. In a next step S418, the page completion confirmation signal (403), i.e. the MCF is sent to the personal computer 14 as an end confirmation (207). If the end confirmation (207) is detected, the personal computer 14 sends a disconnection command (107) to the facsimile apparatus 12 in a step S419. Therefore, the facsimile apparatus 12 sends a disconnection signal (306), i.e. a DCN (disconnect) to the addressing facsimile apparatus, and sends an acknowledgment (208) to the personal computer 14. Then, the facsimile apparatus 12 disconnects the lines.

Thus, in accordance with the basic transmission sequence, the computer image data from the personal computer 14 is sent to the addressing facsimile apparatus via the facsimile apparatus 12.

Next, with referring to FIG. 3 and FIG. 5, an operation of a file print mode wherein the computer image data from the personal computer 14 is received and printed-out by the facsimile apparatus 12 will be described. In addition, the operation of the print mode is basically the same as the aforementioned transmission mode, and therefore, a duplicate description will be omitted in the following.

Figure 5:
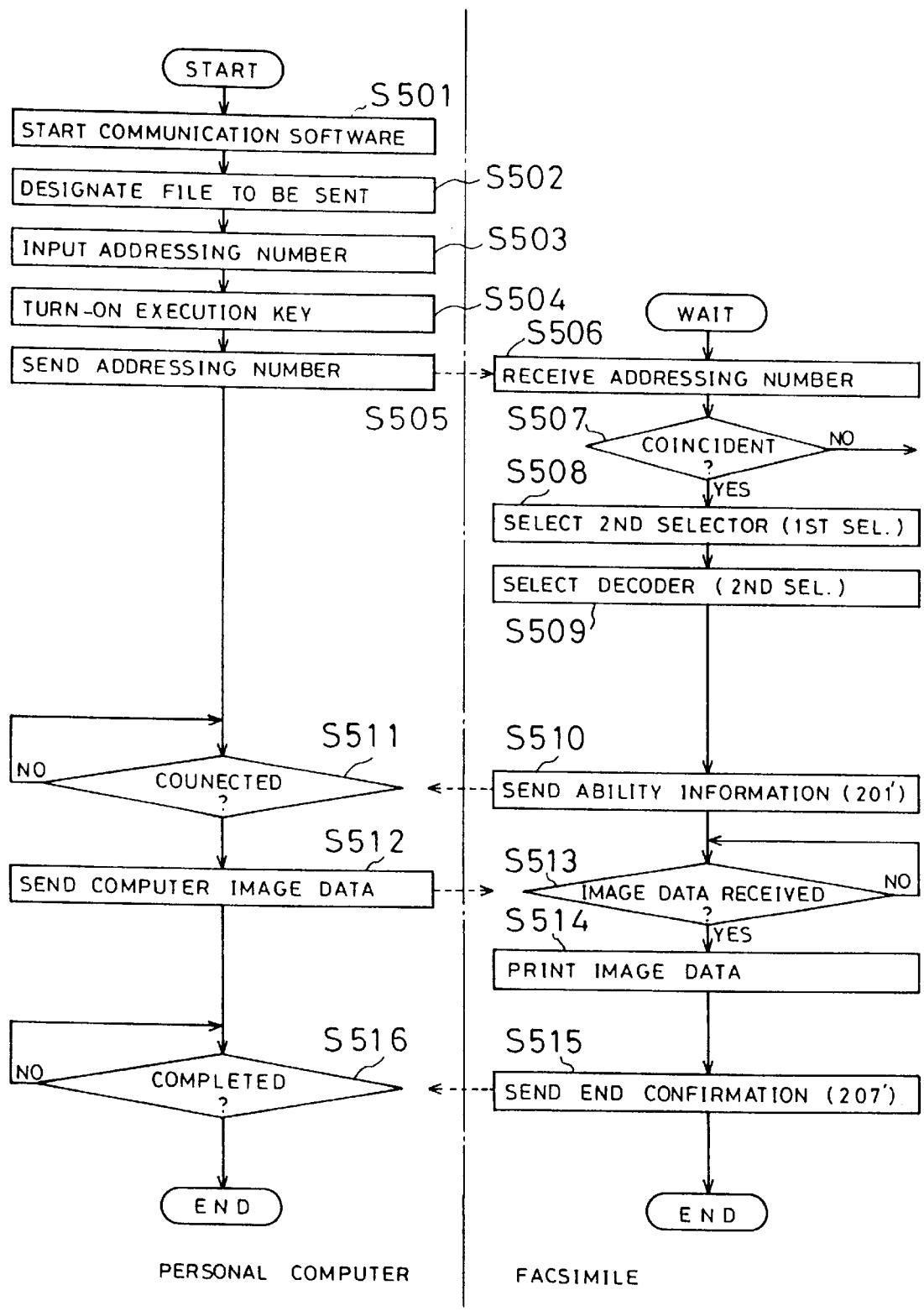
FIG. 5 is a flowchart showing an operation of FIG. 3.

In a step S502 of FIG. 5, the operator designates by the input circuit 20 a file of the personal computer 14 to be printed-out, and in a step S503, the operator inputs an addressing facsimile apparatus to which a designated file is to be transmitted, i.e. the own number indicative of the facsimile apparatus 12 through the input circuit 20. Then, in a step S504, the operator operates the execution key (not shown).

In the file print mode, since the own number is sent as an addressing number from the personal computer 14 to the facsimile apparatus 12, in a step S508, "YES" is determined. That is, the determination circuit 30 detects the coincidence of the own number of the own number memory 28 and the addressing number inputted from the personal computer 14. Therefore, in a step S509 and a step S510, the first selector 32 is switched-over to the second selector 34, and the second selector 34 is switched-over to the decode circuit 40. In other words, a condition by which the computer image data from the personal computer 14 is inputted to the decode circuit 40 is set.

Thereafter, in a step S511, the facsimile apparatus 12 sends ability information (201') similar to that of the transmission mode to the personal computer 14. At this time, since the file print mode is set, the addressing facsimile apparatus is the facsimile apparatus 12 itself. Therefore, the ability information (201') is information indicating an ability or function of the facsimile apparatus 12. In addition, it will be easily understood that no signal is sent and received between the facsimile apparatus 12 and another facsimile apparatus in the print mode.

The personal computer 14 determines the connection of the telephone line is completed between the personal computer 14 and the addressing facsimile apparatus through the reception of the ability information (201') from the facsimile apparatus 12. In addition, in the print mode, as well seen from FIG. 3, in response to the training command (104) sent from the personal computer 14, the facsimile apparatus 12 returns a dummy training result information (204') to the personal computer 14. A reason why is that in the print mode, there is no other facsimile apparatus to which the computer image data from the personal computer 14 is to be sent, and the network between the facsimile apparatus 12 and the other facsimile apparatus is not established.

Thereafter, when the computer image data from the personal computer 14 is sent to the facsimile apparatus 12 in a step S513, the computer image data is inputted to the decode circuit 40 through the first selector 32 and the second selector 34 (step S515). Therefore, the computer image data from the personal computer 14 is printed-out by the recording portion or the printer 42 of the facsimile apparatus 12.

Thus, by starting the general-purpose communication software on the personal computer 14 and by inputting the own identification information as the addressing information, by utilizing the recording portion 42 of the facsimile apparatus 12, the computer image data from the personal computer 14 can be printed-out. At this time, it is not required to change the general-purpose communication software.

In the above described embodiment, since the computer image data outputted from the personal computer 14 is data being compressed, a communication time between the personal computer 14 and the facsimile apparatus 12 may be short. In addition, it is possible to transmit a file held by the personal computer 14 to the facsimile apparatus 12 with character codes; however, in such a case, it is necessary to provide a font data memory for converting the character codes into image data in the facsimile apparatus 12. In contrast, in the above described embodiment, since the personal computer 14 applies the image data to the facsimile apparatus 12, it is not required to provide the font data memory, and therefore, it is possible to implement the facsimile system with low cost.

Furthermore, in the above described embodiment, since the data being compressed and coded, i.e. the computer image data is outputted from the personal computer 14, the computer image data is not required to be applied to the encode circuit 36 in the facsimile apparatus 12; however, in a case where the computer image data is decoded and encoded again in the facsimile apparatus 12, the computer image data is to be applied to the above described encode circuit 36. For example, in a case where the general-purpose communication software supports only the MH code or the MR code while the facsimile apparatus 12 and another (addressing) facsimile apparatus utilize an MMR (Modified MR) encode method, even if the MR code is designated by the request to send command (103) from the personal computer 14, the facsimile apparatus 12 can encode the computer image data with utilizing the MMR code so as to send another facsimile apparatus. In such a case, in the facsimile apparatus 12, the computer image data of the MR code is decoded, and decoded image data may be converted into the MMR code with utilizing the encode circuit 36.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. First facsimile apparatus comprising:
   an interface for receiving, without using telephone lines, image data from an information processing apparatus which executes a general-purpose facsimile communication application software program including a transmission function by which document image data produced by said information processing apparatus can be transmitted to a second facsimile apparatus via said first facsimile apparatus, and a reception function by which document image data sent to said first facsimile apparatus from a second facsimile apparatus can be written in a memory included in said information processing apparatus, said information processing apparatus sending to said first facsimile apparatus document image data together with addressing information utilizing said transmission function of said general purpose facsimile communication application software program;

a print means for printing out image data;

a holding means for holding self identification information for identifying said first facsimile apparatus;

determination means for determining whether or not the facsimile addressing information provided by said information processing apparatus corresponds to said self identification information of said first facsimile apparatus, said determination means producing a first signal when there is correspondence and a second signal when there is no correspondence;

a first means responsive to said first signal for sending first response information to said information processing apparatus indicating that said document image data received from said information processing apparatus is to be printed by said print means;

an image data supplying means responsive to said first signal for supplying said document image data from said information processing apparatus to said print means;

a second means responsive to said second signal for sending second response information to said information processing apparatus indicating that said document image data received from said information processing apparatus is to be transmitted to a second facsimile apparatus remote from said first facsimile apparatus; and a transmission means responsive to said second signal for transmitting said document image data provided by said information processing apparatus to said second facsimile apparatus.

2. A first facsimile apparatus according to claim 1, further comprising a second means responsive to said second signal for sending second response information to said information processing apparatus indicating that image data information received from said information processing apparatus is to be sent to a remote facsimile apparatus; and a transmission means responsive to said second signal for transmitting the image data from said information processing apparatus to another facsimile apparatus remote from said first facsimile apparatus.

3. A first facsimile apparatus according to claim 2, wherein said first response information includes first ability information indicative of at least one ability characteristic of said first facsimile apparatus.

4. A first facsimile apparatus according to claim 2, wherein said second response information includes second ability information indicative of at least one ability characteristic of said another facsimile apparatus.

5. A method for controlling a first facsimile apparatus having self-identification addressing information and a print means for printing-out image data, the first facsimile apparatus being coupled without using telephone lines to an information processing apparatus which executes a general-purpose facsimile communication application software program, including a transmission function by which document image data produced by said information processing apparatus can be transmitted to a second facsimile apparatus via said first facsimile apparatus and a reception function by which document image data sent to said first facsimile apparatus from a second facsimile apparatus can be written in a memory included in said information processing apparatus, comprising the steps of:

sending from said information processing apparatus to said first facsimile apparatus document image data together with addressing information utilizing said transmission function of said general purpose facsimile communication application software program, including the steps of:

(a) determining at said first facsimile apparatus whether or not facsimile addressing information sent from said information processing apparatus corresponds to the self identification address information identifying said first facsimile apparatus;

(b) sending first response information to said information processing apparatus indicating that the document image data from said information processing apparatus is to be printed by said print means when it is determined that said facsimile transmission addressing information corresponds to said self identification information in said step (a) and (c) supplying the document image data from said information processing apparatus to said print means when it is determined that said facsimile transmission addressing information corresponds to said self identification information in said step (a);

sending second response information to said information processing apparatus indicating that said document image data received from said information processing apparatus is to be transmitted to a second facsimile apparatus remote from said first facsimile apparatus; and transmitting said document image data provided by said information processing apparatus to said second facsimile apparatus.

6. First facsimile apparatus comprising:

an interface for receiving without using telephone lines image data from an information processing apparatus which executes a general-purpose facsimile communication application software program including providing facsimile transmission addressing information;

print means for printing out image data;

a holding means for holding self identification information for identifying said first facsimile apparatus;

determination means for determining whether or not facsimile addressing information received from said information processing apparatus corresponds to said first facsimile apparatus self identification information, said determination means producing a first signal when there is correspondence and a second signal when there is no correspondence;

a first means responsive to said first signal for sending first response information to said information processing apparatus indicating that image data received from said information processing is to be printed;

an image data supplying means responsive to said first signal for supplying image data from said information processing apparatus to said print means for printing;

a second means responsive to said second signal for sending second response information to said information processing apparatus indicating that image data received from said information processing apparatus is to be transmitted to another facsimile apparatus remote from said first apparatus; and a transmission means responsive to said second signal for transmitting the image data from said information processing apparatus to another facsimile apparatus remote from said first facsimile apparatus.

7. A first facsimile apparatus according to claim 6, wherein said first response information includes first ability information indicative of at least one ability characteristic of said first facsimile apparatus.

8. A first facsimile apparatus according to claim 6, wherein said second response information includes second ability information indicative of at least one ability characteristic of said another facsimile apparatus.

9. A method as in claim 5 further comprising the steps of:

sending second response information to said information processing apparatus when it is determined that said addressing information received from said information processing apparatus does not correspond to said self identification information; and transmitting the image data from said information processing apparatus to another facsimile apparatus remote from said first facsimile apparatus when it is determined that said addressing information received from said information processing apparatus does not correspond to said self identification information.

10. A first facsimile apparatus according to claim 9, wherein said first response information includes first ability information indicative of at least one ability characteristic of said first facsimile apparatus.

11. A first facsimile apparatus according to claim 9, wherein said second response information includes second ability information indicative of at least one ability characteristic of said another facsimile apparatus.

* * * * *